Figure 1:
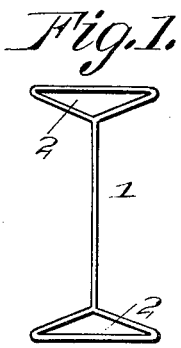

G. W. BROOKS.
FIREPROOF BEAM.
APPLICATION FILED SEPT. 22, 1910.

991,603.

Patented May 9, 1911.

2 SHEETS—SHEET 1.

Witnesses

Inventor
George W. Brooks,
E. H. Bond
Attorney

G. W. BROOKS.
FIREPROOF BEAM.
APPLICATION FILED SEPT. 22, 1910.
991,603.
Patented May 9, 1911.
2 SHEETS—SHEET 2.
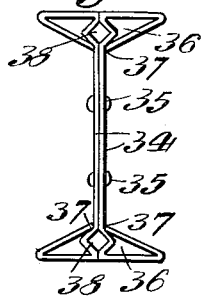
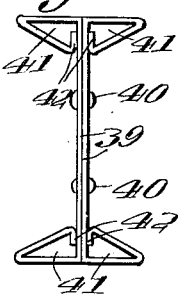
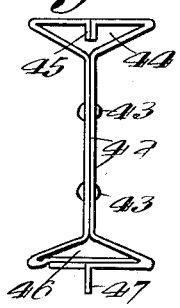
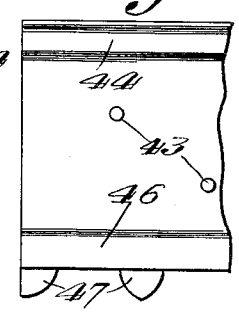
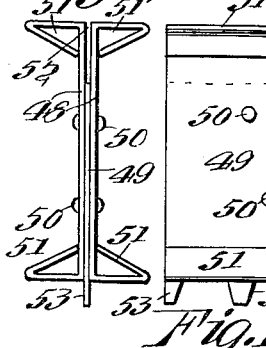
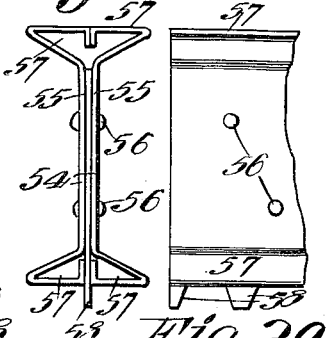
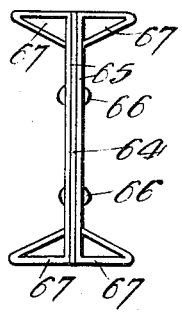
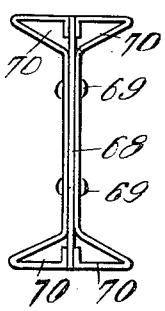
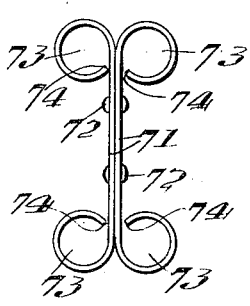
Witnesses
E. D. B. Brown.
M. A. Bond.
Inventor
George W. Brooks,
E. H. Bond
Attorney

UNITED STATES PATENT OFFICE.

GEORGE WILLIAM BROOKS, OF TOPEKA, KANSAS.

FIREPROOF BEAM.

991,603. Specification of Letters Patent. Patented May 9, 1911.

Application filed September 22, 1910. Serial No. 583,247.

*To all whom it may concern:*

Be it known that I, GEORGE W. BROOKS, a citizen of the United States of America, and resident of Topeka, in the county of Shawnee and State of Kansas, have invented certain new and useful Improvements in Fireproof Beams, of which the following is a specification.

This invention relates to certain new and useful improvements in metallic beams designed for use in the construction of buildings, bridges and other structures.

The present invention has for its objects among others to provide an improved form of beam so constructed that the resistance to the destructive action of fire in proportion to the weight of the beam is greatly increased.

It is a well known fact that beams used for joists, rafters, studding etc. in buildings in place of lumber have their flanges mostly exposed to destructive action in case of fire. Such beams as heretofore constructed for building purposes have been built up generally of two plates of metal each formed into a channel shape and then secured together back to back. The horizontal flanges are a single sheet of metal with raw or single edges at the extremities. When subjected to fire, these flanges are quickly distorted and the beam destroyed. By my construction of beam this weakness is removed and I provide a light, strong beam with the maximum fire resisting qualities. To accomplish this result, I make the flange of my beam hollow, forming a chamber which may be an air chamber or which may, if desired, be filled with any heat resisting material. In use the air or heat resisting filling of the hollow flange by its reluctance delays the absorption of heat, thus enabling the beam to resist fire longer than a solid metal beam of equal cross section or a beam formed of plates of channel iron.

Beams constructed in accordance with my invention may be used for any and all purposes where lightness, strength and fire resisting qualities are requisite.

In my improved beam there are no raw or single edges to be exposed to possible fire. All exposed parts are metallic shells protected by the reluctant fire resisting agent therein. Although I prefer to make my beams similar in outline to standard sections, it is evident that other forms may be employed.

In some forms I provide the flanges with crevices into which nails may be driven to secure the flooring thereto, upon the one side, and expanded metal or other lathing for ceiling material, upon the other side. In some instances I may provide a projection in the bottom flange to which material may be secured. Other features of construction may be embodied in the different forms as will hereinafter appear.

As the essential features of the invention may be embodied in a great variety of forms of beam, I have not attempted to herein illustrate all of such forms, but in the accompanying drawings I have shown some of the forms of my hollow flange beam, it being understood, however, that the invention is not restricted to the particular forms herein illustrated.

Such forms as I consider most expedient are clearly illustrated in the accompanying drawings, which, with the numerals of reference marked thereon, form a part of this specification, and in which—

Figures 2, 3:
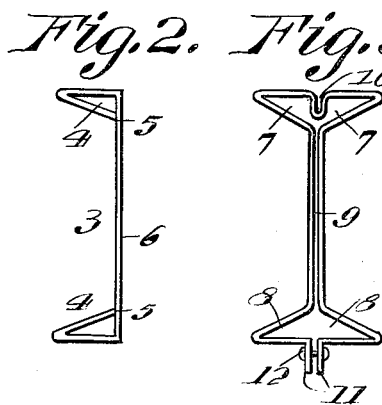
Figure 4:
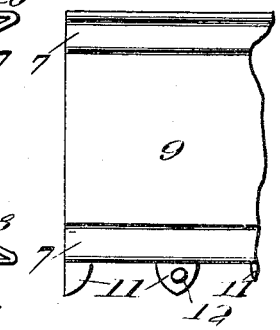
Figure 5:
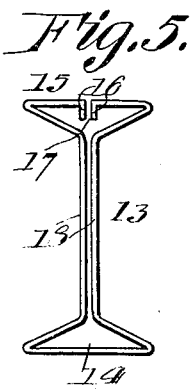
Figure 6:
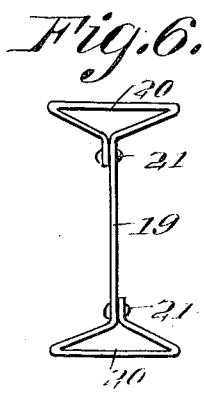
Figure 7:
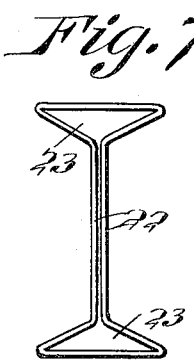
Figure 8:
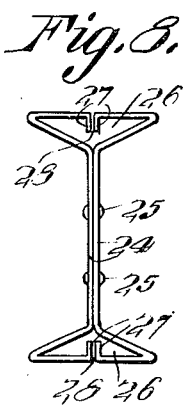
Figure 9:
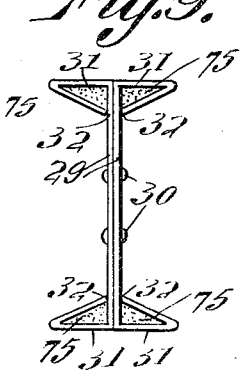
Figures 10, 11:
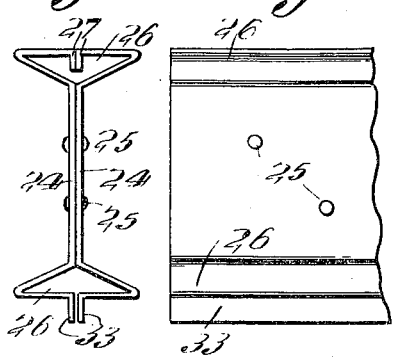

Figure 1 is an end elevation of an I-beam constructed in accordance with my invention. Fig. 2 is a similar view of a channel beam. Fig. 3 is a similar view of another form of beam bent from a single plate. Fig. 4 is a detail of Fig. 3 in side elevation. Fig. 5 is an end elevation of another form of beam bent from a single plate. Fig. 6 is a similar view of a hollow flange beam of different form bent or drawn from a single plate. Fig. 7 is a similar view of a hollow flange beam rolled or drawn from a tube or any endless section such as a square with seamed, riveted or welded joint. Fig. 8 is a similar view of a hollow flange beam built up of two plates. Fig. 9 is a similar view of another form. Fig. 10 is a similar view of still another form. Fig. 11 is a detail in side elevation of the form shown in Fig. 10. Fig. 12 is an end elevation of still another form composed of two plates. Fig. 13 shows still another form. Fig. 14 is a like view of still another form. Fig. 15 is a side elevation, in detail, of Fig. 14. Fig. 16 is a bottom plan of Fig. 14. Fig. 17 is an end elevation of a hollow flange beam built up of three plates. Fig. 18 is a detail showing a side elevation of Fig. 17. Fig. 19 is an end elevation of still another form of beam built up of three plates. Fig. 20 is a side elevation of Fig. 19. Fig. 21 shows in end elevation still another form of beam composed of three plates. Fig. 22 is a side elevation of Fig. 21. Fig. 23 is an end elevation of still another form of beam built up of a plurality of plates with an interposed sheet of lumber or the like. Fig. 24 shows still another form constructed as in Fig. 23. Fig. 25 is an end elevation of another form of beam composed of two plates showing a different shape of the hollow flange.

Like numerals of reference indicate like parts throughout the different views.

Referring to the drawings, 1 in Fig. 1 designates an I-beam formed of a single piece of material bent into the shape shown and embodying hollow flanges 2 at the top and bottom. It is to be noted that the edges of the material are returned to the vertical center or web, thereby forming the said hollow flanges.

In Fig. 2 I have shown a channel beam 3 with top and bottom hollow flanges 4. In this form the raw edges 5 abut against the vertical member or web 6.

In Fig. 3 I have shown another form of I-beam formed from a single plate bent to form the top hollow flanges 7 and the bottom hollow flanges 8. The adjacent vertical members 9 are disposed parallel with each other and may be in more or less close proximity to each other. In this instance, in the top of the beam is formed a longitudinal crevice 10 for the reception of nails or other means employed for securing a flooring thereto, while at the bottom the two edges of the material from which the beam is formed are extended downward to form depending flanges 11 which may be continuous, or, as seen in Fig. 4, they may be interrupted. The result in both instances is substantially the same, these flanges serving as means for receiving metal lathing or other ceiling material, suitable bolts or the like 12 being employed for retaining such material in place between the flanges.

In Fig. 5 I have shown still another form in which the I-beam 13 is formed of a single plate or piece bent into the requisite shape to form the hollow bottom flange 14 and the hollow top flanges 15. In this instance, the edges of the material are bent downward within the hollow flanges 15 to form the depending flanges 16, leaving a space or crevice 17 therebetween for the reception of the nails or other means employed for securing the flooring in position. The vertical members 18 constitute the web and these may be arranged in more or less close proximity to each other.

In Fig. 6 I have shown a hollow flange beam bent or drawn from one plate and comprising the web 19 and the top and bottom hollow flanges 20. The edges of the material are extended upon opposite sides of the web and toward each other and secured to said web by rivets or the like 21.

In Fig. 7 there is shown another form of hollow flange beam rolled or drawn from a tube or any endless section, such as a square, the two vertical portions 22 forming the web, and there being the top and bottom hollow flanges 23, as shown. The joint may be seamed, riveted or welded.

In Fig. 8 there is shown a hollow flange beam built up of two plates, the vertical portions 24 thereof being disposed in close proximity to each other and secured together by rivets or the like 25. The opposite ends of these two plates are bent into form to constitute the upper and lower hollow flanges 26, the adjacent free edges of the two plates being bent inward forming the inwardly extending top and bottom flanges 27, leaving a space or crevice 28 therebetween for the reception of nails or other means employed for affixing the flooring thereto.

In Fig. 9 there is shown still another form in which the beam is composed of two plates, the adjacent vertical portions 29 of which arranged in close proximity to each other constitute the web, the same being secured together by rivets or analogous devices 30. The free edges of the plates are bent into the form shown to constitute the top and bottom hollow flanges 31, the free edges 32 of said plates being bent inwardly and bearing against the web portions.

In Fig. 10 there is shown a hollow flange similar to that shown in Fig. 8 except that the lowermost edges of the plates are bent downwardly to form the depending flanges 33. The lower flanges 27 in the form shown in Fig. 8 and these flanges 33 seen in Fig. 10 serve to receive between them and retain metal lathing or other ceiling material or whatever it may be desired to affix thereto. The vertical portions of the plates are secured together by rivets or the like 25.

In Fig. 12 I have shown still another form of hollow flange beam composed of two plates, the vertical members 34 being secured together by rivets or the like 35 and constituting the web of the beam. The edges of the two plates are bent to form the top and bottom hollow flanges 36, the free edges 37 being bent inward and having a bearing against the web portions and between the top and bottom ends of the beam and the points where the edges 37 bear against the web, each plate is bent into angular form, as seen at 38, to form a reinforce to enable the beam to better withstand heavy weight and to form a bearing for the free edges of the plates. This provides a very strong construction of beam.

In Fig. 13 there is shown still another form of hollow flange beam composed of two plates, the vertical portions 39 of which being secured together by the rivets 40 constitute the web, the edges of the two plates being bent to form the top and bottom hollow flanges 41, the free edges 42 of the plates being bent parallel with and in opposite directions toward the ends of the beam and having elongated bearings against the web thereof.

In Fig. 14 there will be found still another construction of hollow flange beam composed of two plates, the vertical members 42 of which are arranged flat against each other and secured together by rivets or the like 43, the upper edges being bent to form the upper hollow flanges 44, the free edges being turned downwardly forming the depending flanges 45 in the crevice or opening between which the nails or other securing means of the flooring are designed to be engaged. The lower edges of these two plates are bent to form the bottom hollow flange 46, the edges being bent parallel with each other and at right angles to the web and overlapped to form a double bottom, the said edges being interengaged and provided with depending portions 47 for attachment of metal lathing or other material.

It is evident that a beam embodying the novel features hereinbefore described can be constructed of more than two plates and in Figs. 17 to 24 I have shown some of the different forms of beams thus constructed. For instance, in Fig. 17 I have shown a beam, the two outer plates of which are similar to the form shown in Fig. 9, the vertical members 48 forming the web being separated and receiving between them the third plate 49, the whole being secured together by the rivets or the like 50, thus constituting a beam with a web of increased thickness. The edges of the outer plates are bent to form the top and bottom hollow flanges 51, with a crevice 52 at the top for the reception of nails or other means employed in securing the flooring thereto. The center plate 49 depends beneath the bottom of the beam, as shown at 53, forming means for the attachment of metal lathing or other material as may be desired.

In Fig. 19 I have shown another form of beam composed of three plates, this form being substantially that seen in Fig. 10 with the intermediate plate 54, the vertical portions 55 being secured to said plate 54 which is confined between them by the rivets or the like 56. The beam has the top and bottom hollow flanges 57 and the center plate 54 has the depending portions 58, as seen in Figs. 19 and 20, for the same purpose as the depending portions in the other forms.

In Fig. 21 is shown a beam of three-plate construction, this being substantially the same as the form shown in Fig. 13 with the intermediate plate 59 confined between and secured to the vertical members 60 by rivets or the like 61 and constituting the three-thickness web. Hollow flanges 62 at top and bottom are provided and the center plate depends, as seen at 63, for the same purpose as the depending portions of the other forms hereinbefore described.

In Fig. 23 I have shown a beam of three-plate construction, the same being similar to that shown in Fig. 9 with the center plate 64 interposed between the vertical members 65 and constituting the three-thickness web, the parts being secured together by the rivets or the like 66. The edges of the outer plates are bent to form the hollow flanges 67. In this instance, the center plate 64 is of wood or artificial lumber or the like, preferably rendered fire-proof, and to which the flooring upon the one side and the lathing upon the other side may be secured in any of the well-known ways.

In Fig. 24 there is shown another form of three-plate construction, the same being similar to the form shown in Fig. 8 with the intermediate member 68 which may be of wood or artificial lumber, preferably rendered fire-proof. Rivets or the like 69 secure the two outer vertical portions and the intermediate plate 68 together and the edges of the outer plates are bent to form the hollow flanges 70.

In Fig. 25 I have shown another form varying from the standard I-beam or channel construction and composed of two plates, the vertical portions 71 of which are secured together by rivets or the like 72 to form the web, the opposite edges of the plates being bent into substantially circular form forming the hollow flanges 73. The free edges 74 of the plates are bent up against the web of the beam, as shown.

The hollow flanges in any or all of the constructions hereinbefore described may be designed to contain air or, if desired, and in some cases it may be preferable to fill these hollow flanges with some heat-resisting material, as is shown at 75 in Fig. 9. This may be asbestos, fiber or any material suited to the purpose and while I have shown this heat-resisting material or substance in the hollow flanges of but one form, it is to be understood that this may be employed in any or all of the other forms in lieu of air, as circumstances may require.

Modifications in details may be resorted to without departing from the spirit of the invention or sacrificing any of its advantages.

What is claimed as new is:—

1. A metallic beam provided with a hollow flange at each face with a crevice in the outer face of one of said flanges.

2. A metallic beam with a hollow flange with a crevice on its outer face with the edge of the material concealed within the hollow of the flange.

3. A metallic beam with hollow flanges with the edges of the material concealed within the hollows of the flanges, said beam being provided on one face with a crevice.

4. A metallic beam with hollow flanges provided on one face with a crevice and on the other face with provision for the attachment of material, the edges of the material of said beam being disposed in a plane substantially parallel with that of the web of the beam.

5. A metallic beam having hollow flanges upon its opposite faces with a connecting web reinforced, one of said hollow flanges having a crevice and the other means for attachment of metal lathing etc.

6. A metallic beam having hollow flanges, one of which is provided with a crevice and a reinforced web with the edges of the material disposed in a plane parallel with that of the web.

Signed by me at Topeka, Kansas, this 17th day of September 1910.

GEORGE WILLIAM BROOKS.

Witnesses:
FRED. W. COCHRAN,
WILLIAM GRANT LOWRIE.